Aug. 12, 1930.  M. S. YOUNG  1,772,474
COMBINATION DISCHARGE AND INFLOW CONTROL MEANS
Filed Dec. 30, 1926  2 Sheets-Sheet 1
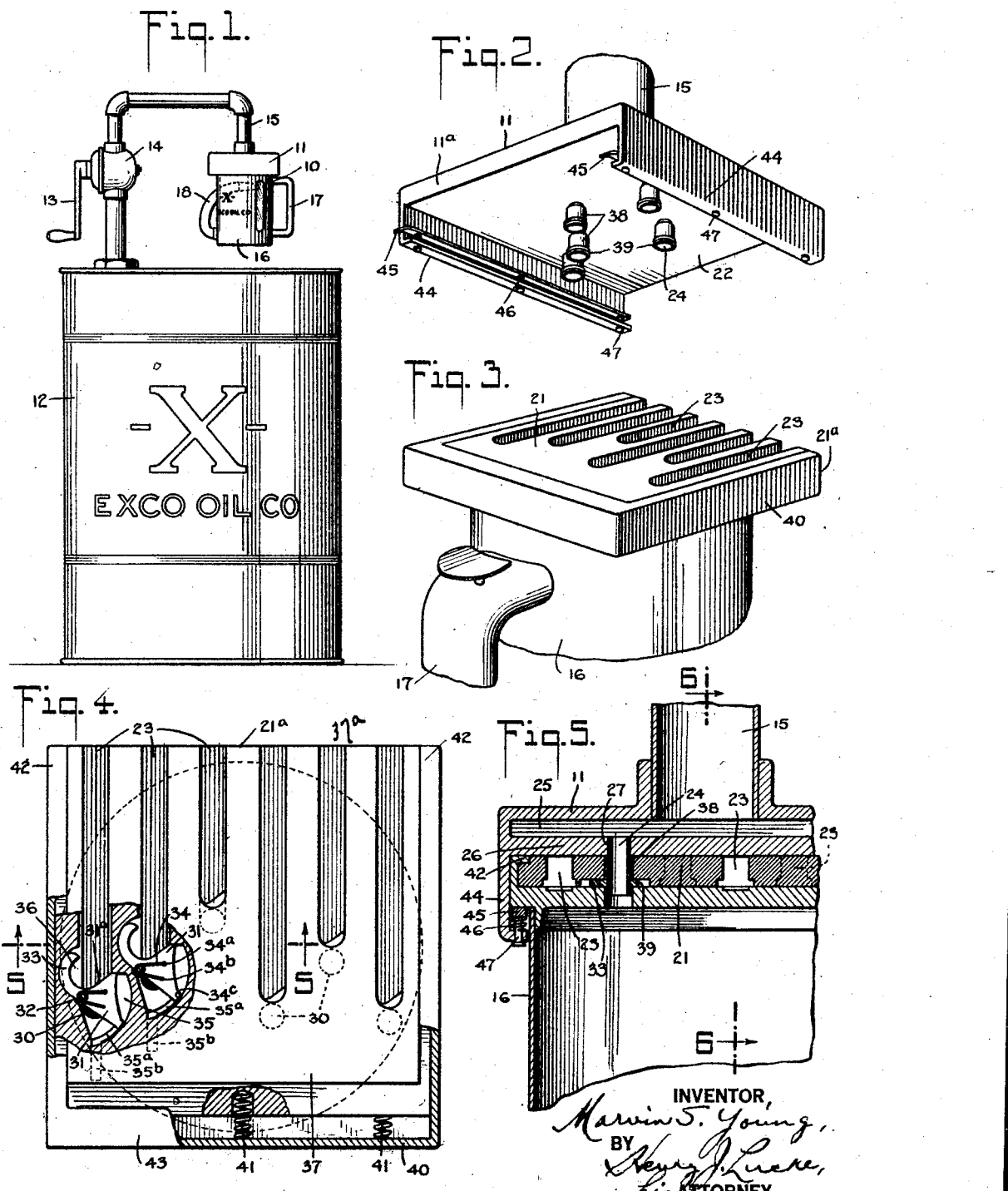

Aug. 12, 1930. M. S. YOUNG 1,772,474
COMBINATION DISCHARGE AND INFLOW CONTROL MEANS
Filed Dec. 30, 1926 2 Sheets-Sheet 2
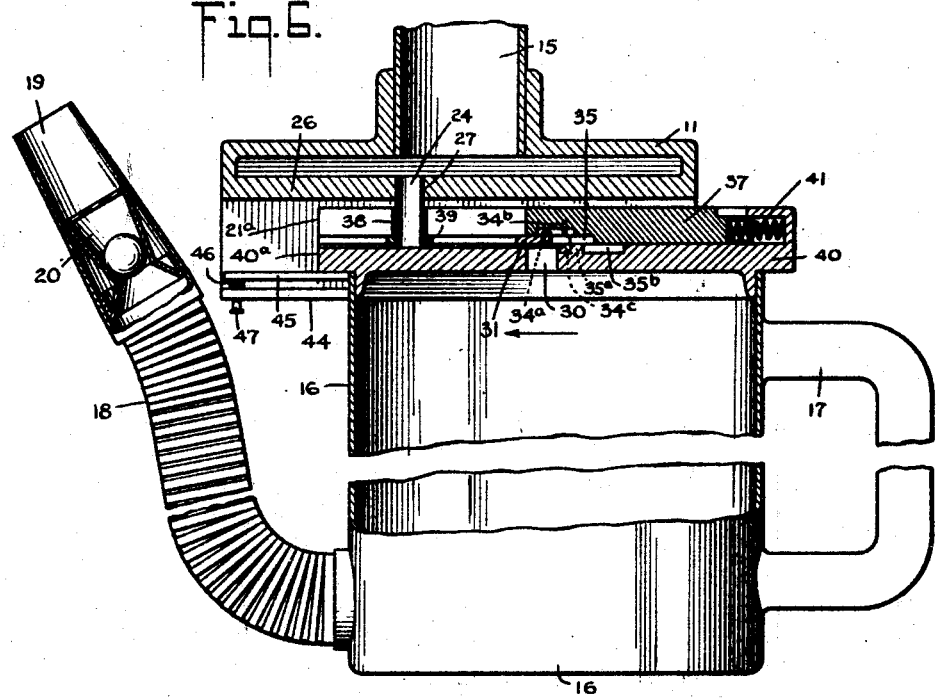
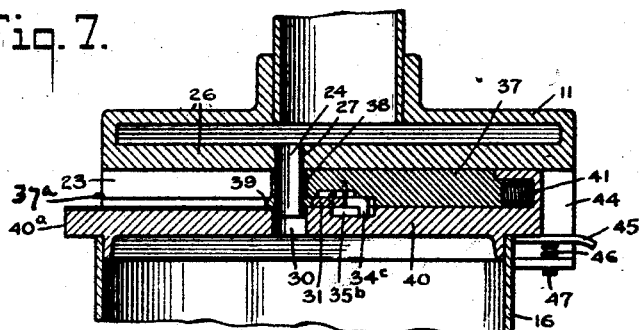
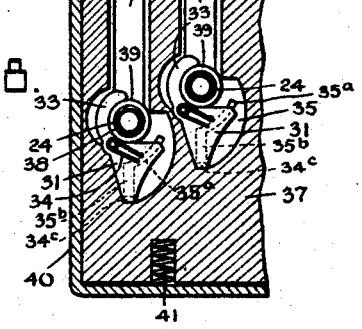
INVENTOR,
Marvin S. Young,
BY
Henry Kuehle,
ATTORNEY.

Patented Aug. 12, 1930

1,772,474

REISSUED

UNITED STATES PATENT OFFICE

MARVIN S. YOUNG, OF NEW YORK, N. Y.

COMBINATION DISCHARGE AND INFLOW CONTROL MEANS

Application filed December 30, 1926. Serial No. 157,903.

This invention relates to means for sealing a portable container such as a measuring can and means for unsealing said container by the cooperating filling device which is adapted to fit the specific container.

My invention is directed to the various types of embodiments for insuring the delivery to a customer of a commodity of any particular brand. My invention finds itself readily adaptable at the present time for motor oils and the respective embodiments of my invention are utilized in measuring and dispensing cans, bottles and the like combined with any suitable tank, such as the usual pump tank, also in a combined nozzle of the hose of tank wagons with the standpipe of a reservoir tank, and similarly for other forms of storage and dispensing units.

It will be understood that my invention is also applicable for other commodities and the various embodiments of my invention are modified if necessary to be utilized with the respective forms of containers employed in the distribution, storage and dispensing of such commodities.

I now describe a preferred form of my invention for measuring containers and pump tanks.

In such form of my invention, the measuring vessel is provided with an inlet control element coacting with a discharge control element of the outflow pipe of a pump tank, whereby upon properly positioning the measuring vessel relative to the discharge of the outflow pipe of the pump tank, communication between the outflow pipe and the interior of the measuring vessel is automatically established, to enable the oil or the like to flow from the pump tank into the measuring vessel upon operation of the pump handle.

The measuring vessel may be of the usual pint, quart, two-quart or other desired capacity, or a set of the same, and the pouring spout of each vessel is provided with any approved form of non-refillable device.

In the commercial uses of my invention, each measuring vessel may be printed or otherwise marked with the name of the particular brand of the commodity corresponding to the printing or other marking on the tank.

It will be understood that tanks containing other brands or grades of motor oil or other commodity and the corresponding measuring vessel or set of measuring vessels are correspondingly printed or otherwise marked.

As one preferred form of combined discharge control element and coacting inlet control element, say for example as applied to a pump tank in present day use and a measuring and dispensing can, the discharge control element comprises a set of discharge teats of a predetermined number spaced relative to one another and the inlet control element of the measuring can comprises a set of slots coordinated in number and relative position to form a combination in the sense of that of a combination lock for a safe or the like, whereby such measuring can or set of measuring cans is solely capable of effecting operative communication between such discharge teats of the discharge control element and suitable openings in the inlet control element of the measuring can. Such openings of the inlet control element are normally closed by individual valves, to close the communication therethrough when the can is removed from its combination pump tank and thus prevent filling the can with a spurious brand of the commodity. When the inlet control element is moved into operative relation with its coacting discharge control element, such valves are automatically moved to their open positions.

The pump tank or other storage receptacle may be provided with a non-refillable inlet, but preferably with an inlet control element coacting with a discharge control element carried by the nozzle of a hose, pipeline or the like to afford communication of such hose or equivalent with the interior of the tank to insure the filling of the tank with the particular motor oil or other commodity.

Further features and objects of the invention will be more fully understood from the following detail description and the accompanying drawings, in which Fig. 1 is a front elevation of an approved type of pump tank for motor oil, having its discharge pipe provided with a discharge control element coacting with an inlet control element of a can, pursuant to my invention;

Fig. 2 is a detail perspective view, looking upwardly, of a discharge control element indicated in Fig. 1, on a greatly enlarged scale;

Fig. 3 is a perspective view looking downwardly of a coacting inlet control element carried by the measuring can;

Fig. 4 is a top plan view of the inlet control element shown in Fig. 3, certain of the parts thereof being broken away to show otherwise hidden parts; this view shows in such broken away portion valve members of the inlet control element in their closed position.

Fig. 5 is a sectional elevation on line 5—5 of Fig. 4;

Fig. 6 is a sectional elevation on line 6—6 of Fig. 5, showing the measuring can at a partial position of insertion relative to the discharge control element of the pump tank;

Fig. 7 is a detail sectional elevation of parts corresponding to those shown in Fig. 6, the measuring can and its control inlet, however, being in final and communicating position relative to the discharge control element of the pump tank, and Fig. 8 is a detail top plan view similar to Fig. 4, showing the valve members of the inlet control element in fully open position.

As is indicated hereinabove, the drawings illustrate one embodiment of my invention as applied to the present day type of measuring can and coordinated with the nozzle end 11 of the discharge conduit element as the terminal of the outflow of a present day pump tank 12. Such pump tank usually embodies a crank handle 13 for operating its pump 14 to measure the quantity of oil delivered while drawing up oil from the interior of the tank.

For commercial advantages, such pump tank is usually painted or otherwise marked with the particular brand of oil or other commodity, and also with the name of the producing or distributing company. Likewise, each measuring can, or set of measuring cans for any particular pump tank or equivalent is painted or otherwise marked for similar identifying purposes.

In Fig. 1 I have indicated a measuring can 16, say of the usual two-quart capacity. Such can 16 is provided with a handle 17 and may have a flexible pouring spout 18. The discharge end 19 of the spout 18 is preferably provided with any suitable type of non-refillable device 20, to prevent the filling of the measuring can 16 through its spout 18, as shown in Figure 6.

Pursuant to my invention, the top of the measuring can 16 and the nozzle end 11 of the discharge conduit of the pump tank 12 or other supply are coordinated with a set of control elements 21, 22 to form a combination selected for the particular motor oil or other commodity. Such control elements 21, 22 are selected in the arrangement of the respective coacting parts whereby upon positioning the can 16 to dispose its inlet control element 21 in proper relation to the discharge control element 22 of the nozzle 11 by any convenient relative movement as by sliding one relative to the other as indicated by the relative portions of the control elements 21, 22 appearing in Fig. 2 and Fig. 3.

Such control elements 21, 22 are arranged in this instance by sliding the measuring can 16 under the nozzle 11 of the pump, which is conveniently carried out by grasping the handle 17 of the can 16. The inlet control element 21 of the can 16 is provided with a series of slots 23 for receiving a set of discharge teats 24 carried by the discharge control element 22 of the nozzle 11. The lengths of the respective slots or depressions 23 correspond to the selected "combination" positions of the respective teats 24 relative to the anterior edge 11ª of the nozzle 11. The edge 21ª is the anterior edge of the inlet control element 21 in effecting the sliding movement of the cam 16 relative to the nozzle 11.

Such teats 24 may be of any desired number and are spaced relative to one another as may be predetermined by the "combination" selected.

As is illustrated in Fig. 5 and Fig. 6, the discharge control element 22 is provided with an inflow chamber 25 which is bounded at its lower face by a wall 26 which is imperforate excepting at the respective locations of the openings 27 through which the teats 24 pass. Adjacent each slot 23 of the inlet control element 21 of the measuring can 16 is an opening 30 which normally is closed by suitable means, to thereby preclude the filling of the measuring can 16 through such openings or passages 30 with a spurious brand of goods. A suitable form of closure for such openings or ports 30 is a valve which is automatically moved to its open position upon effecting operative relation between the inlet control element 21 of the can and the discharge control element 22 of the nozzle of the discharge pipe of the pump, and upon removal of the measuring can from operative relation with the discharge control element of the pump, such valves are moved to their closed positions. One suitable form of such valve and its opening and closing movement imparting means comprises an imperforate body portion 31 having outwardly flaring lateral sides, said body portion 31 being pivotally mounted at a central location on a fixed pin 32. The body part 31 is integral with a tail portion 33 having a curved configuration. The spring 34 serves to bias the valve to locate its body portion 31 to close ts opening 30. The body portion 31 and its tail portion 33 are located in the respective recesses 35, 36 which are off-set from the direction of length of the slot 23, as appears in Fig. 4. One end 34ᵃ of the spring 34 is secured in a recess in the body part 31 (see Fig. 4) and its opposite end 34ᵇ is anchored in a recess, such as in the cover plate 37 of the inlet control element 21, through which cover plate 37 the respective slots 23 extend longitudinally (see Figure 6). The spring 34 is coiled about the pivot pin 32 of its valve.

In order to open the normally closed inflow control element 21, to fill the container 16 of which it is an integral part to prevent unauthorized filling by any other means, the projecting teats 24, which are the normally open conduits from the discharge nozzle, are brought in contact with the longitudinal slots 23. As the container 16 is forced along the under side of the nozzle 11, the flaring edge 31ᵃ of the body portion 31 of each valve comes in contact with its respective teat. These teats 24, which are preferably provided with a sleeve 38 slidably mounted thereon as shown in Figures 2 and 5, in contacting with the flaring edge 31ᵃ, cause the valve to rotate about its center point against the tension of the spring 34. Such action will then uncover the respective openings 30 which will be in direct communication with the teats 24 and will permit a direct flow from the discharge nozzle 11 into the container 16.

As appears from Figs. 7 and 8, the respective tail portions 33 serve to embrace the lower and terminal portions of the corresponding teats 24, to thereby hold the corresponding sliding sleeves 38 in their raised positions, namely by engagement of each tail portion 33 with the lower enlarged flange 39 of its sliding sleeve 38.

Preferably, the inlet control element 21 comprises relatively movable members in which the set of grooves 23 and the set of corresponding openings 30 are respectively disposed, thereby enabling the openings 30 to be disposed in non-alignment with the termini of the slots 23 when the inflow control element is in non-operative position relative to the discharge control element. One preferred form is shown in Figs. 4 to 8, in which embodiment of my invention the upper member 37 in which the slots 23 are disposed, is slidingly mounted within the lower member 40, the lower member serving as a casing of the inflow control element 21. The expansile springs 41 serve to normally hold the sliding member 37 in the position shown in Fig. 4, at which stage the outer edge 37ᵃ of the sliding member 37 is in substantial register with the outer edge 40ᵃ of the casing member 40. The flanges 42 at the upper lateral edges and the flange 43 at the rearward edge of the casing member 40 serve as guides for the reciprocation of the slide member 37.

As appears in Fig. 2, the discharge control element 22 is preferably formed to provide guideways for receiving and aligning the parts of the inflow control element 21, and for such purpose I provide the oppositely disposed, lateral, depending flanges 44, which are inwardly turned at their lower edges toward one another, and support the opopsitely disposed track rails 45, which are resiliently mounted on the springs 46 and pins 47.

Preferably, the sliding member 37 of the inflow control element is locked in its normal position against sliding movement relative to the casing member 40 and unlocked solely when brought into operative relation with its "combination" discharge control element 22. Such locking and unlocking relationship may be attained by the provision of the downwardly turned flange 34ᶜ for the body portion 31 of each valve, the arcuate slot 35ᵃ extending below the recess 35 and the longitudinal slot 35ᵇ communicating at the terminal of the arcuate slot 35ᵃ at a location substantially in alignment with its slot 23. Downwardly turned flange 34ᶜ of the valve is normally positioned within the arcuate slot 35ᵃ, whereby any unauthorized attempt by means of an illegal discharge control device or if tampered with by wires or the like in the effort to "pick" the inflow control element, or to force the sliding member 37 relative to the casing member 40, the flanges 34ᶜ of the respective valve members encounter the faces of the arcuate slots 35ᵃ respectively, and thereby resist such movement. However, upon properly positioning my inflow control element relative to its "combination" discharge control element, the respective valves are rotated about their respective pivots 32, thereby rotating the respective flanges 34ᶜ of the body portions 31 of the valves within the arcuate slots 35ᵃ for the full throw of the valve body portions 31, thereby uncovering the respective inflow openings 30 and moving the respective flanges 34ᶜ into position with their arcuate slots 35ᵃ.

The discharge parts 24 are the same in number as the slots 23. They must be spaced from the right hand end (Fig. 2) of the nozzle 11, the same distance as the lengths of the slots 23. Then when the nozzle 11 is applied to the inlet controlling element 21, the parts 24 will all engage the inner end of the slots 23 together and turn the valves 31 to uncover the ports 30 and move the member 37 with regard to the part 40 back as far as it will go to bring the parts 24 in register with the ports 30 to fill the container 16. If the parts 24 were not properly placed, one or more of them will not go into register with the ports 30, and part of the discharge thru the nozzle 15 would take place out of the open ends of the slots 23 instead of to the container 16. Hence, the parts 24 and the valve 31 and ports 30 must occupy corresponding positions or the purpose of the construction will be defeated. With this device, the nozzle member 11 will fit into the inlet controlling element 21 and only the container 16 can be filled, the nozzle 11 being unsuited to any other container. In practice the operator simply moves the container relatively to the nozzle 11 with the parts 24 into the slots 23 as far as he can, forcing the member 37 back as far as it will go against the springs 41. It will not be practical to try to "pick" the valves 31 open because the filling of the container 16 in this way would be too difficult and tiresome.

In a similar manner, my invention is applicable for coordinating by "combination" control the discharge of motor oil or other fluid commodity from a nozzle of a hose of a tank wagon, or from the outlet of a pipeline into tanks, including pump tanks, storage tanks or the like. Likewise, my invention is applicable for co-ordinating a nozzle of a hose of a tank wagon with the inlet of a standpipe leading to a reservoir, storage or other tank.

In the particular embodiment of my invention as illustrated in the drawings, the positioning of the discharge control element and the inflow control element is attained by laterally directed relative movement which I have hereinabove termed a "sliding" movement, which character of relative movement is also adaptable for hose nozzles, pipelines and the like of the fluid discharge means coordinated by a selected "combination" with the inlet of fluid receiving means such as pump tanks, dispensing tanks, storage tanks and the like. However, my invention is adaptable in certain preferred embodiments whereby the discharge control element is brought into operative relation with its "combination" inflow control element by inserting the hose nozzle or the like within the inlet of the fluid receiving means and attaining the desired communication by relative longitudinal movement similar to the manner of inserting a "combination" key within the key-opening of its "combination" lock, and either accompanied by a rotative movement of the key or not.

In the application of my invention for the supply, distribution and dispensing of gasoline, similar coordinated discharge control and inflow control elements are respectively positioned on the discharging and receiving elements employed.

It will be noted in the specific embodiment of my invention as illustrated in the drawings that the widths and depths of the slots in addition to the number and lengths of the same serve as variants in the "combination" of my coordinated discharge and inflow control elements.

It will be appreciated that the usual demand of the trade in motor oils, gasoline and the like is for the delivery to the purchaser of the genuine goods desired by the purchaser and such object is attained by those embodiments of my invention wherein the nozzle of the fluid discharging means is normally in open position, but provided with a form of control means coacting with a normally closed inflow control means whereby the inlet means of said inflow controlling means is moved to open position. Such action of my control means for the discharge of said fluid discharging means simulates that of a key and the action of my inflow controlling means simulates that of a lock.

While I show a preferred form of embodiment of the invention, it is to be understood that many modifications may be made therein without departing from the spirit thereof, and I therefore desire a broad interpretation of the principles of the invention, as disclosed hereinbefore and as claimed hereinafter.

I claim:

1. The combination of fluid discharge means, fluid receiving means, discharge control means adjacent the outlet of said fluid discharge means and inflow control means disposed adjacent the inlet of said fluid receiving means, said discharge control means and inflow control means mutually cooperating at a plurality of points to permit passage of fluid into said fluid receiving means, and means to permit discharge of fluid from said receptacle.

2. The combination of a fluid discharge conduit provided with a discharge control element adjacent the end thereof and a container to receive fluid from said conduit and provided with an inflow control element, said inflow control element cooperating with a particular discharge control element at a plurality of points to permit filling of said container, and means on said container to solely permit discharge of fluid therefrom.

3. The combination of a fluid discharge means, fluid receiving means, discharge control means adjacent the outlet of said fluid discharge means and inflow control means disposed adjacent the inlet of said fluid receiving means, said inlet control means being provided with normally closed valves and projections in corresponding positions on said discharge control element to open said vavle to effect communication therebetween.

4. The combination of fluid discharge means, fluid receiving means, discharge control means disposed adjacent the outlet of said fluid discharging means and inflow control means disposed adjacent the outlet of said fluid receiving means, said inlet control means being provided with a plurality of prearranged normally closed valves, said discharge control means being provided with a plurality of projections in positions corresponding to the valves to open said valves to permit communication therebetween.

5. The combination of fluid discharge means, fluid receiving means, discharge control means disposed adjacent the outlet of said fluid discharge means and inflow control means disposed adjacent the inlet of said fluid receiving means, said inflow control means being provided with a plurality of depressed slots, each of said slots being provided with a conduit therethrough and cooperating projections on said discharge control element to communicate respectively with said conduits to provide communication therebetween.

6. The combination of fluid discharge means, fluid receiving means, a discharge control element adjacent the outlet of said fluid discharge means and an inflow control element disposed adjacent the inlet of said fluid receiving means and sealing said fluid receiving means, said inlet control element being provided with a plurality of openings spaced in a predetermined manner, a movable cover plate disposed above said openings, projections on said discharge control element, said projections being similarly spaced in a predetermined manner to cooperate with said movable cover to move said cover and uncover said openings, said projections providing the sole communication between said discharge control element and said fluid container when the container is forced into position against said projections.

7. In a fluid dispensing device of the class described comprising a discharge conduit having a key nozzle on the end thereof, a fluid container having normally closed inlet valves, projections on said key nozzle, said container having cooperating depressions therein, said projections opening said valves when said container is forced into contact with said projections, and means on said container to permit fluid discharge therefrom.

8. In a fluid dispensing device of the class described comprising a discharge conduit having a key nozzle on the end thereof, a fluid container having normally closed inlet valves, projections on said key nozzle of predetermined spacing and number, said container having cooperating depressions therein of a similar predetermined spacing and number, said projections opening said valves when said container is forced into contact with said projections and resilient means to force said projections in said conduits into fluid tight communication.

9. The combination of fluid discharge means, fluid receiving means disposed adjacent the outlet of said fluid discharge means, inflow control means disposed adjacent the inlet of said fluid receiving means, said fluid discharge means being provided with a series of projections in communication therewith and being spaced in a predetermined manner, said inflow control means being provided with a plurality of similarly spaced ports in communication with said container and intermediate means normally sealing said ports, said intermediate means being displaced by the cooperating projections of the fluid discharge means to prevent the unauthorized receipt of fluid by said container.

10. The combination of fluid discharge means, fluid receiving means disposed adjacent the outlet of said fluid discharge means, inflow control means disposed adjacent the inlet of said fluid receiving means, said fluid discharge means being provided with a series of projections in communication therewith and being spaced in a predetermined manner, said inflow control means being provided with a plurality of similarly spaced ports in communication with said container and intermediate means normally sealing said ports, said intermediate means including an upper member whose thickness is substantially that of the height of said projections, said upper member being provided with elongated slots of a number and spacing corresponding to the number and spacing of the projections and a means locking said upper member from movement, said projections coacting with said locking means to permit movement of the upper member to permit communication between the discharge means and the container, said locking means being displaced by said projections to prevent the unauthorized receipt of fluid by said container.

11. The combination of fluid discharge means, fluid receiving means, discharge control means disposed adjacent the outlet of said fluid discharge means, and inflow control means disposed adjacent the inlet of said fluid receiving means and cooperating with the discharge control means for effecting communication between the fluid discharge means and the fluid receiving means, said inflow controlling means comprising a set of inflow passages and individual valve means for normally closing said inflow passages and unitary means for holding said individual valve means in closed position.

12. The combination of fluid discharge means, fluid receiving means, discharge control means disposed adjacent the outlet of said fluid discharge means and inflow control means disposed adjacent the inlet of said fluid receiving means and cooperating with said discharge control means for effecting the communication between said fluid discharge means and said fluid receiving means, said inflow controlling means comprising a set of inflow passages, individual valve means for normally closing said inflow passages, unitary means held by said individual valve means in closed position and means operative upon the proper positioning of said discharge control means relative to said inflow control means for operating said unitary means and opening the valves.

13. The combination of fluid discharge means, fluid receiving means, discharge control means, disposed adjacent the outlet of said fluid discharge means and inflow control means disposed adjacent the inlet of said fluid receiving means and co-acting with said discharge control means for opening communication between the outlet of said fluid discharge means and the inlet of said fluid receiving means, said inflow controlling means comprising a set of normally closed inflow passages and a relatively laterally movable member serving to normally close same, said discharge control means being provided with a plurality of hollow projections corresponding to said inflow passages adapted to move said movable member to complete communication between said discharge control means and said fluid receiving means.

14. The combination of fluid discharge means, fluid receiving means, discharge control means disposed adjacent the outlet of said fluid discharge means and inflow control means disposed adjacent the inlet of said fluid receiving means and co-acting with said discharge control means for opening communication between the outlet of said fluid discharge means and the inlet of said fluid receiving means, said inflow controlling means comprising a set of normally closed inflow passages and a relatively laterally movable member serving to normally close said inflow passages, said discharge control means being provided with a plurality of hollow projections corresponding to said inflow passages adapted to move said movable member to complete communication between said discharge control means and said fluid receiving means, said discharge control means being further provided with a guide way and resilient means for normally holding the hollow projections in fluid tight communication with said inflow passages.

15. The combination of fluid discharge means, fluid receiving means, normally closed inflow control means disposed adjacent the inlet of said fluid receiving means and means disposed adjacent the outlet of said fluid discharge means cooperating with said inflow controlling means for opening communication between said outlet and said fluid receiving means, said inflow controlling means comprising a plurality of passages, individual valves for said passages, a relatively movable member for normally holding said valve in closed position, and means projecting from said fluid discharge means corresponding in position to the valves for opening all of said valves to permit communication therethrough.

In testimony whereof I have signed this specification this 22nd day of December, 1926.

MARVIN S. YOUNG.